United States Patent
Lamy et al.

(10) Patent No.: US 7,302,632 B2
(45) Date of Patent: Nov. 27, 2007

(54) METHOD AND SYSTEM FOR THE PROTECTION OF DATA WITH A HEADER IN A TRANSMISSION SYSTEM

(75) Inventors: Catherine Lamy, Paris (FR); Didier Nicholson, Asnieres S/Seine (FR)

(73) Assignee: Thales, Neuilly-Sur-Seine (FR)

( * ) Notice: Subject to any disclaimer, the term of this patent is extended or adjusted under 35 U.S.C. 154(b) by 606 days.

(21) Appl. No.: 10/791,745

(22) Filed: Mar. 4, 2004

(65) Prior Publication Data

US 2004/0181715 A1 Sep. 16, 2004

(30) Foreign Application Priority Data

Mar. 7, 2003 (FR) .................................. 03 02881

(51) Int. Cl.
 *H04N 7/66* (2006.01)
(52) U.S. Cl. ...................................... 714/776; 714/779
(58) Field of Classification Search ................ 714/776, 714/779
 See application file for complete search history.

(56) References Cited

U.S. PATENT DOCUMENTS

| 5,327,438 A | | 7/1994 | Okuyama | |
|---|---|---|---|---|
| 5,581,481 A | * | 12/1996 | Weerackody et al. | .......... 341/50 |
| 5,923,274 A | * | 7/1999 | Fischer | .......... 341/94 |
| 6,243,496 B1 | * | 6/2001 | Wilkinson | ............ 382/245 |
| 6,317,462 B1 | * | 11/2001 | Boyce | .......... 375/240.27 |
| 6,339,658 B1 | * | 1/2002 | Moccagatta et al. | ......... 382/240 |
| 6,396,958 B1 | * | 5/2002 | Wilson | ......... 382/246 |
| 6,728,410 B1 | * | 4/2004 | Fukunaga | ........... 382/236 |
| 6,989,773 B2 | * | 1/2006 | Wee et al. | ........... 341/51 |
| 7,006,576 B1 | * | 2/2006 | Hannuksela | ........... 375/240.27 |
| 7,010,003 B2 | * | 3/2006 | Watanabe et al. | ........... 370/522 |
| 7,051,247 B2 | * | 5/2006 | Kikuchi et al. | ............ 714/701 |
| 7,051,248 B2 | * | 5/2006 | Kikuchi et al. | ............ 714/701 |
| 7,124,346 B2 | * | 10/2006 | Park et al. | .................. 714/758 |
| 7,124,429 B2 | * | 10/2006 | Nagai et al. | ................ 725/135 |
| 2004/0114576 A1 | * | 6/2004 | Itoh et al. | .................. 370/352 |

FOREIGN PATENT DOCUMENTS

WO WO 0 936 772 8/1999
WO WO0173973 A 10/2001

OTHER PUBLICATIONS

Aikawa S et al "Forward Error Correction Schemes For Wireless Atm Systems" International Conference on Communications (ICC) NY Jun. 23, 1996.
Natu A et al: "Unequal Protection of JPEG2000 code streams in wireless channels" Globelcom'Feb. 2002 IEEE Global Telecommunications Conference NY Nov. 17, 2002.
Moccagatta I et al: "Error-Resilient Coding in JPEG-2000 and MPEG-4" IEEE Journal on Selected Areas in Communications, IEEE Inc. New York, Jun. 6, 2000.

* cited by examiner

*Primary Examiner*—Stephen M. Baker
(74) *Attorney, Agent, or Firm*—Lowe Hauptman Ham & Berner, LLP

(57) ABSTRACT

In a method to protect and/or detect information in a data transmission system, the pieces of data exchanged have a format comprising one or more headers and a data zone. The method comprises at least one step for the insertion, into at least one header, of at least one EPB marker segment comprising redundancy data to detect and/or correct errors.

16 Claims, 2 Drawing Sheets

METHOD AND SYSTEM FOR THE PROTECTION OF DATA WITH A HEADER IN A TRANSMISSION SYSTEM

BACKGROUND OF THE INVENTION

1. Field of the Invention

The present invention relates especially to a method and a system for the protection of compressed data against errors.

It can be applied in the field of lossy transmission caused by the transmission medium (for example in wireless transmission).

It can be applied for example lossless or lossy image transmission systems using the JPEG 2000 standard.

The invention can also be used in any data transmission system whose format comprises a header including markers related to the data that follow the header.

2. Description of the Prior Art

In the JPEG 2000 (ISO/IEC 1544) standard, there are tools for taking account of errors that may result from the transmission of bitstreams or codestreams or files in an environment propitious to errors. These tools described in the T.800|ISO/IEC 154444-1 recommendation are used to detect the presence of errors during the entropic decoding of a JPEG 2000 decoder and/or to resynchronize the decoding method in the case of losses of data packets. These tools, however, cannot be used to prevent the presence of errors in the headers (main header or tile header) or correct errors that may be present in the codestream.

Modifications in the method of entropic encoding/decoding can be used either to augment the mechanism of taking account of the errors proposed in the JPEG 2000 standard and/or obtain an error protection mechanism. The advantage of these techniques is that it provides a very efficient compromise between the added redundancy and protection and error decoding capacity. The resulting codestream unfortunately is then not compliant with the definition of a JPEG 2000 (Recommendation T.803|ISO/IEC 154444-4) mechanism for taking account of errors.

JPEG 2000 also includes many options used to build and order compressed data in different ways. In particular, it assembles information.

After a particular ordering and formatting of the data structure, it is possible to separate the JPEG 2000 codestream into several parts. Each of these parts has a different degree of sensitivity to errors. Thus identified, each part can then be protected according to its level of sensitivity and its importance in the stream in using different redundancy levels. This enables the setting up of a data protection mechanism that is unequal for the different parts of the stream, thus greatly improving performance in terms of bandwidth or power consumed relative to the transmitted payload information. The drawback of the use of such a method is that it generally relies on the separation of the streams of different sensitivity, which are encoded and transmitted separately. Since different parts of the data stream cannot be decoded separately, it then proves to be necessary, after the error correction decoding, to again combine the data to regenerate a JPEG 2000 stream (compliant with the T.803|ISO/IEC 154444-4 recommendation).

The reference Poulliat.C, Vila P., Pirez D., Fijalkow I., entitled "Progressive JPEG 2000 Image Transmission over noisy channel", Eusipco 2000, Toulouse, France, 3rd-6th Sep. 2000, describes a solution of this kind for the unequal protection of data using RCPC (Rate Compatible Punctured Convolutional) codes.

The document by Ambarish Natu, David Taubma, "Unequal Protection of JPEG 2000 Code-Streams in Wireless Channels", IEEE GLOBECOM'2, discloses another solution of unequal protection against errors. The method uses Reed Solomon codes to protect a JPEG 2000 codestream against errors. In this document, the protection of the header against possible errors is not evoked, and the redundant information is used solely by data packets of the codestream. The packets are modified to include the redundant information. The resultant codestream is not compliant with the mechanism for taking account of errors defined in the T.803|ISO/IEC 15444-4 recommendation.

The object of the present invention relies especially on a novel approach for which the redundant information used for error correction and/or decoding is inserted into the header.

SUMMARY OF THE INVENTION

The object of the present invention relates to a method to protect information transmitted in a data transmission system, the data exchanged having a format comprising one or more headers and a data zone. It is characterized in that it comprises at least one step for the insertion, into at least one header, of at least one EPB marker segment compatible with the format of the data exchanged and comprising redundancy data to detect and/or correct errors.

An EPB marker segment is positioned for example in the main header or else after a header located at the start of a data zone An EPB marker segment may include a part designed to protect the header by using a default code and another part corresponding to the error correction code specified in the parameter of the EPB.

The method is used for example in the case of the transmission of JPEG 2000 images.

The invention also relates to a system of data transmission, the data transmission format comprising at least one header and payload data. The system is characterized in that it comprises at least one transmitter adapted to the insertion, into at least one header, of at least one EPB marker segment compatible with the format of the data transmitted and comprising redundancy data to detect and/or correct errors.

The object of the invention has especially the following advantages:

- it is compatible with the existing JPEG 2000 standard since the resulting stream is compliant with the JPEG 2000 recommendation. The existing decoders, including those not covered by the JPEG recommendation, part 11, do not have to be modified.
- the tools used for error detection and for overcoming the effects of error (resilience tools) proposed by the JPEG 2000 can always be used while at the same time offering protection for header errors, unequal protection against errors, and being compliant with the JPEG 2000 definition (T.803|ISO/IEC 154444-4 recommendation).
- the redundant data needed for error detection and correction are memorized in dedicated zones in the JPEG 2000 codestream.
- the redundant data (redundant information) makes it possible, with an appropriate error correction code, to detect and correct erroneous data. The type of error correction code can be specified along with the range of data of the codestream to be protected by each code.

BRIEF DESCRIPTION OF THE DRAWINGS

Other features and advantages of the invention shall appear more clearly from the following description of exemplary embodiments given by way of an illustration that in no way restricts the scope of the invention, made with reference to the appended figures, of which.

MORE DETAILED DESCRIPTION

Figure 1:
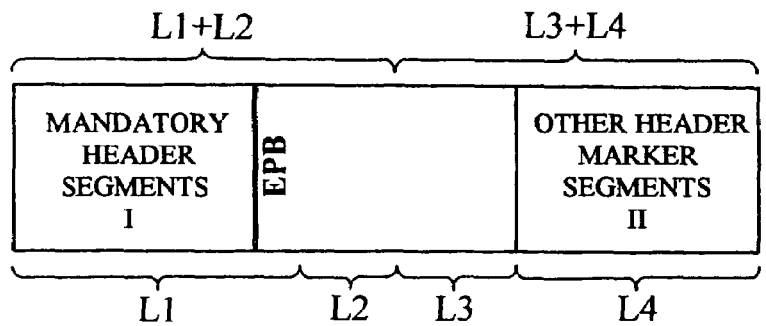
FIG. 1 exemplifies an arrangement of a dedicated EPB marker segment in the main header of the data stream, FIG. 2 exemplifies a syntax for an EPB marker segment (or dedicated marker segment) according to the invention.

For a clearer understanding of the principle implemented by the invention, the following example is given by way of an illustration that in no way restricts the scope of the invention for lossy or lossless JPEG 2000 image transmission systems (compliant with ISO/IEC 15444 standards). The idea according to the invention consists especially of the insertion of one or more marker segments hereinafter called EPB (Error Protection Block) segments compatible with the format of the data transmitted. Complying with the syntax of the marker segment of the standard concerned, these EPBs contain redundant information that will enable the correction and/or the detection of the errors.

The redundant information used for the correction and/or the detection of the errors is inserted for example into the main header and/or into the tile header. This redundant information is generated for example by means of the tools of the following list:

Data check code (CRC),
Repetition of data,
Systematic error correction code.

The redundant data can be used especially with the appropriate error correction code to detect and/or correct erroneous data.

The example is given for a data transmission system compliant with the JPEG 2000 standard comprising a transmitter comprising for example an encoder adapted to the insertion of the redundant information and a receiver comprising, for example, a decoder adapted to the decoding and/or correction of errors.

It may be recalled that, in the JPEG 2000 format, the format of the data transmitted comprises a main header referenced I in the figure, one or more tile headers II and data known as payload data (containing information). The main header is located at the beginning of the codestream. The tile headers are generally placed at the beginning of each tile part. As in the case of the other markers (defined in part I of JPEG 2000 (ITU-T Rec. T.800|ISO/IEC 15444-1), the EPB markers defined in the present invention have a length of two bytes. The value of the first byte is 0xFF. The second byte specifies the use of the marker and may take a value ranging from 0x01 to 0xFE except for those already defined by the recommendations ITU-T Rec. T.81|ISO/IEC 10918-1 and ITU-T Rec. T.84|ISO/IEC 10918-3.

An EPB type segment marker comprises a marker and the parameters associated with the marker. By definition, the first two bytes of any EPB placed immediately after the marker corresponds to an integer known as "an unsigned big endian integer value" that indicates the length in bytes of the parameters of the marker (which includes the two bytes of this length of the parameter but does not include the two bytes of the marker itself). For an EPB marker segment that is not specified in the ITU-T T.800|ISO/IEC 15444-1 recommendation, the decoder of the system will use the length of the parameter to eliminate the marker segments. A decoder compliant with the JPEG 2000 part 1 will omit the unrecognized EPB marker segment and will not take account of the data containing the redundant information. A decoder according to the invention will be capable of interpreting and using the redundancy.

In brief, the invention makes it possible to:
 localize the data block containing the redundant information in the codestream,
 protect the marker itself, its length and its parameters in using a default code,
 specify an error correction code to be used for the remaining part of the redundant data included in the EPB marker segment, according to the part that uses this default code. This function makes it possible to specify any area correction code and use codes for only one part of the JPEG 2000 codestream. It also enables the unequal protection of error.

The figures described here below relate to several examples of the positioning of one or more EPBs in a JPEG 2000 codestream.

FIG. 1 exemplifies a positioning of the EPB marker in any codestream header. In compliance with the format of the stream considered, the EPB segment marker is included immediately after the different mandatory headers (e.g. start of stream marker, etc). The frame start, including the start of the EPB segment marker, is protected by a default code defined beforehand. It is indeed important, in practice, to be able to easily retrieve the size of the protected data in order to be able to apply the error correction decoding efficiently. For example, the protection of this data is achieved by means of a Reed-Solomon RS(L1+L2, L2) code where the L1 payload data are protected by a redundancy having a length L2 contained in the EPB marker segment. With the start of the codestream thus protected, it is then also possible to retrieve the data contained at the start of the EPB marker segment and, therefore, especially the definition of the error code used to protect the data following said marker. The knowledge of this code, for example a Reed-Solomon RS(L3+L4, L4) code, then makes it possible to decode the rest of the stream, in using the redundant data having a length L3 to correct possible errors in the sequence of the headers having a length L4. This is illustrated in the case of the protection of the main header of a JPEG 2000 codestream in FIG. 3 in which, to remain in compliance with the standard, the SOC (Start of Codestream) marker is kept at the head of the frame followed by the SIZ marker. The EPB marker segment described in FIG. 1 carrying redundant information, with the function especially of decoding and correcting errors if any, is therefore inserted immediately after the Image and Tile Size (SIZ) marker.

In this example, the SIZ and EPB markers constitute a first set of data whose length is L1 bytes. This length L1 is protected by L2 redundancy bytes positioned after L1. Thus, the bitstream remains compliant with part I of the JPEG 2000 standard and when the code for the protection is fixed, the decoding is achieved, for example, without requesting the transfer of additional (unprotected) information. This part L1+L2 is, for example, generated by means of a Reed-Solomon RS(L1+L2, L1) code.

The rest of the marker segments (L4 bytes) or the following data packets may thus be protected by the L3 remaining bytes of the EPB, for example by means of an RS(L3+L4, L4) code.

For reasons of efficiency, the method encodes one or more EPBs in a header. In fact, the size of the main header may prove to be fairly large when it includes optional markers such as PPM (Packed Packet headers in Main header). The EPB syntax then comprises an EPB index that enables the presence of several EPBs in the header. The index is positioned at 0 and the EPB alone is present. Otherwise the different EPBs are grouped together.

Figure 2:
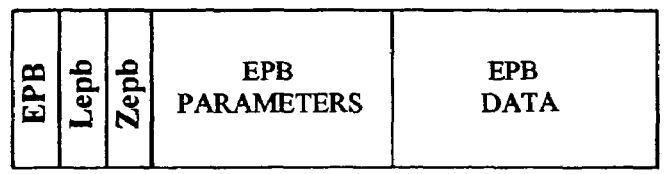

FIG. 2 is a schematic view exemplifying a syntax used for an EPB. The different fields constituting it are:

EPB: code indicating the nature of the marker segment,
Lepb: the length of the marker segment in bytes. By definition, it does not include the length of the code of the marker,
Zepb: index of the marker segment relative to all the other EPBs present in the current header,
Pepb: parameters of the EPB. These parameters define the code used to generate the redundancy information protecting the information following the marker segment,
EPB data: contains the protection data enabling the correction (in general redundancy bits).

Error Correction Code

Two default error correction codes are, for example, defined to respectively protect the start of the main header and the start of the tile headers. In the case of difficult conditions of transmission, these default codes have high correction capacity. They are chosen, for example, in taking account of the size of the most frequent error bursts in the most classic modes of operation, in order to achieve optimum sizing of the correction capacity. As examples of error correction codes, we may cite the RS (128,64) code for the protection of the main header and the RS (44,22) code for the protection of the tile headers.

Specification of an Error Correction Code

The parameters included in the EPB marker segment make it possible to specify the error correction code to be used in the rest of the parts of the encoded stream. These parameters are themselves protected by the preceding error correction code which protects the start of the marker segment, namely the EPB code, the length Lepb and the index Zepb.

It is possible, for example, to specify an error correction code for each EPB marker segment. By using the index function that enables the generation of several EPBi marker segments, it is then possible to specify different error correction codes for a zone of the tile part. The choice of the code is made for example in taking account of the capacity of the error correction code and of the sensitivity to errors of the data packets included in the tile part. It is thus possible, through this mechanism, to obtain an unequal protection of error.

FIGS. 3 to 8 provide a schematic view of different examples of implementation of the principle according to the invention explained here above.

Figure 3:
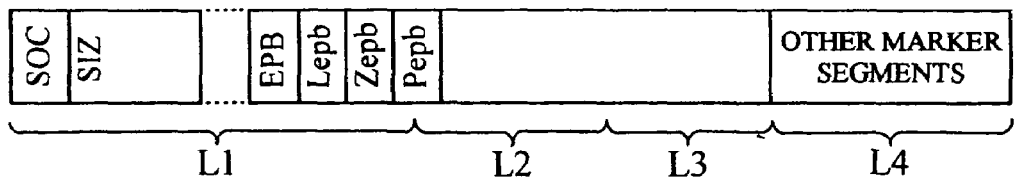
FIG. 3 represents the insertion of the redundant data for the protection of the main header in the context of a JPEG 2000 stream.

FIG. 3 gives a schematic view of an example of protection of the main header.

The first EPB marker segment included in the main header is located for example immediately after the SIZ marker segment. Its size depends on the number of the components of the image. The first EPB marker segment is localized during a synchronization step in using error detection. This synchronization step is simplified by the fact that the place of the EPB marker segment is a highly constrained. Thus, in the context of JPEG 2000, since the SOC field has a fixed size, only the variable size of the SIZ field is liable to modify the place of the EPB marker segment. The different possible sizes of the SIZ field, taking into account the most frequent sizes (with 1, 3 and 4 components) will be tested, and the error detection capacities of the selected corrector code will be used to determine the most probable size, for example by choosing the solution that corresponds to the smallest number of errors detected. It will also be judicious to make use of the knowledge provided by the structure of the JPEG 2000 stream (the number of components contained in the SIZ field and the value set for the EPB marker code) either to carry out an a posteriori verification of the most reliable solution found or to use this knowledge as a priori values in a more elaborate process of error detector decoding.

The main header may contain EPBi marker segments that are grouped or not grouped. In the case of grouped EPBis, the different EPB marker segments are positioned one after the other, before the rest of the information contained in the main header. In the case of marker segments, each of the EPBs appears immediately after the part of the data to which it refers. These two modes of distribution, which are valid for the main header and for the tile headers, are represented here below in the description through examples in the case of a tile header.

Error Protection for the Tile Header

Figure 4:
FIG. 4 represents the insertion of the redundant data for the protection of the tile header in the context of a JPEG 2000 stream.

FIG. 4 gives a schematic view of the case where an EPB marker segment is used to protect the header of the tile part. In this case, the pieces of tile start data, having a length L1, are protected by using the redundancy placed in the part having a length L2 of the piece of EPB data, using the default error correction code for the tile header part. The following pieces of data of the tile header having a length L4 are then protected by the redundancy data placed in the part L3 of the piece of EPB data, using the error correction code specified in the parameter Pepb.

Figure 5:
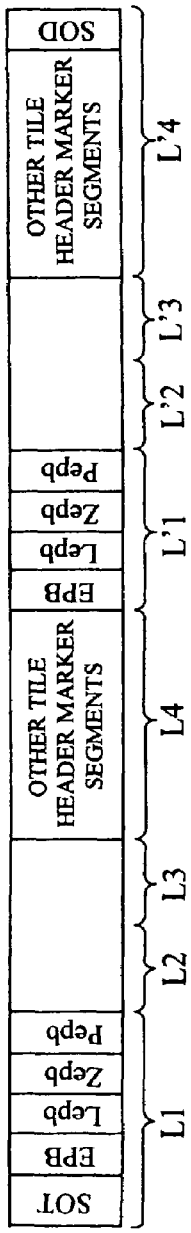
FIGS. 5 and 6 show two alternative embodiments of FIG. 4.

FIG. 5 shows the case where two EPB marker segments are used to protect the header of the tile part. In this example, the pieces of tile start data, having a length L1, are protected by the redundancy placed in the part having a length L2 of the first piece of EPB data. The following pieces of data having a length L4, corresponding to different segments of the tile header, are then protected by the redundancy data placed on the part L3 of the piece of EPB data, by means of the code defined in the parameter Pepb. There then follows a new EPB marker segment whose pieces of data, having a length L'1, are protected by the part L'2 of the piece of EPB data of this second marker segment by means of the default tile error correction code. The following pieces of data having a length L'4, corresponding to different segments of the tile header, are then protected by the redundancy data placed in the part L'3 of the piece of EPB data of this second marker segment by means of the error correction code specified in the parameter of the second EPB marker segment. This structure enables the different fundamental marker segments, such as QCD (Quantization Default), to be protected differently whereas the optional marker segment such as PLT (Packet length Tile Part header) can be protected with less redundancy or even not protected at all.

Figure 6:
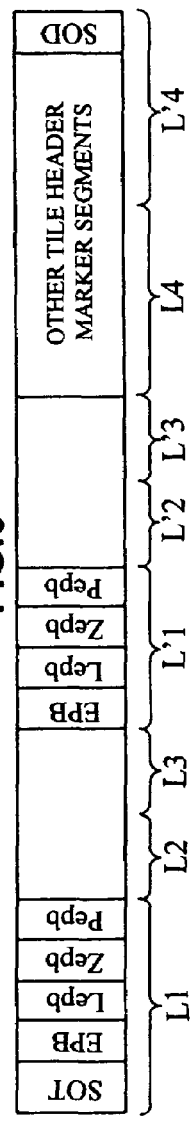

FIG. 6 gives a schematic view of an exemplary application where two grouped marker segments are used to protect the tile header. In this example, the pieces of start-of-header data having a length L1 are protected by the part having a length L2 of the piece of EPB data of the first EPB marker segment by means of the default tile error correction code. The pieces of header data having a length L'1 of the second EPB are protected by the part having a length L'2 of the piece of EPB data of the second marker segment in using this same default tile error correction code. There then follow the data, having a length L4, of header marker segments length protected in using the part having a length L3 of a piece of EPB data of the first marker segment, using the error correction codes specified in the parameter Pepb of the first EPB marker segment. There then follow the pieces of header data having a length L'4, which will be followed by the redundancy having a length L'3 by means of the error correction codes specified by the parameter Pepb of the second EPB marker segment. This structure therefore makes it possible to provide different forms of protection for the marker segment such as QCD (Quantization Default), whereas the optional segments such as the PLT may be protected with less redundancy. Naturally, it may be that certain marker segments are not protected at all, for example in being processed by an EPB marker segment with a redundancy of the L'3=0 type, or in being placed in the header without protection by an EPB marker segment.

Protection of the Data of the Tile Part

Figure 7:
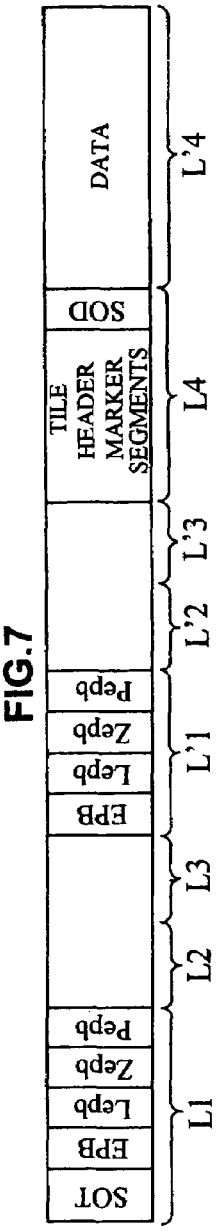
FIG. 7 shows a model for the protection of data for the tile part, FIG. 8 exemplifies the insertion of data in the case of an unequal protection of data.
Figure 8:
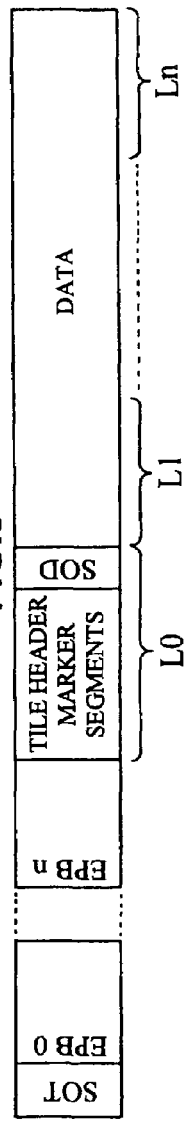

FIGS. 7 and 8 show how the protection capacity can be extended to the data of the tile, namely to the bits located after the SOD marker segment. In the former case, described in FIG. 7, it can be seen how the redundancy data positioned in the different EPB segment markers can protect the data of the packets. In the example described in FIG. 7, the first EPB marker segment protects the data having a length L4 of the header of the tile by means of the redundancy having a length L3 placed in its EPB data field and the error correction code described in its Pepb field. However, the second EPB marker segment protects the data having the length L'4 of the packets that immediately follow the tile header by means of the redundancy having the length L'3 placed in its EPB data field and by means of the error correction code described in its Pepb field. This sub-division can naturally be generalized to a number of EPB marker segments greater than two. Similarly, it is possible to protect header data and data in the same EPB marker segment.

Protection of Data Using Unequal Protection Against Errors

FIG. 8 shows the extension of the above concept to an unequal protection of data. Thus, when the data packet has different levels of sensitivity to errors, it is possible to define several marker segment that will define error correction codes adapted to these different levels of sensitivity. The method then inserts several marker segments EPB0, EPB1, . . . , EPBn into the tile header. Each segment EPBi protects a subset of the data packet. Naturally, the use of different marker segments in no way implies the use of different error correction codes any more than their respective correction capacities. The invention thus provides for unequal protection of data for JPEG 2000 streams.

What is claimed is:

1. A method of protecting information transmitted in a data transmission system, the information transmitted being pieces of data having a format comprising one or more headers and a data zone, wherein said method comprises the step of:

inserting into at least one header at least one EPB marker segment compatible with a format of the data exchanged and comprising redundancy data to detect and/or correct errors.

2. The method according to claim 1, wherein an EPB marker segment is positioned in a main header.

3. The method according to claim 1, wherein the EPB marker segment includes a part designed to protect the header by using a default code and another part corresponding to an error correction code specified in a parameter of the EPB.

4. The method according to claim 1, wherein several segments EPBi protect the data positioned after the header or headers.

5. The method according to claim 1, wherein the data transmitted have different levels of sensitivity to error, and the header comprises several segments EPBi, one segment EPBi comprising an error correction code that is chosen substantially as a function of the levels of sensitivity.

6. The method according to claim 1, wherein the data transmitted have different levels of sensitivity to errors, and the header comprises several segments EPBi, an error correction code within being the same for all the data transmitted.

7. The method according to claim 1, wherein the data are JPEG 2000 images.

8. A system of data transmission, using a data transmission format comprising at least one header and payload data, wherein said system comprises:

at least one transmitter adapted to insert, into at least one header, at least one EPB marker segment compatible with a format of the data transmitted and comprising redundancy data to detect and/or correct errors.

9. The system of claim 8, wherein the EPB marker segment includes a part designed to protect the header by using a default code and another part corresponding to an error correction code specified in a parameter of the EPB.

10. The system of claim 8, wherein the EPB marker segment includes a part designed to protect the header by using a default code and another part corresponding to an error correction code specified in a parameter of the EPB.

11. The system of claim 8, wherein several segments EPBI protect the data positioned after the header or headers.

12. The system of claim 8, wherein the data transmitted have different levels of sensitivity to error, and the header comprises several segments EPBi, one segment EPBi comprising an error correction code that is chosen substantially as a function of the levels of sensitivity.

13. The system of claim 8, wherein the data transmitted have different levels of sensitivity to errors, and the header comprises several segments EPBI, an error correction code within being the same for all the data transmitted.

14. The system of claim 8, wherein the data are JPEG 2000 images.

15. The system of claim 8, wherein an EPB marker segment is positioned in a main header.

16. The system of claim 15, wherein the EPB marker segment includes a part designed to protect the header by using a default code and another part corresponding to an error correction code specified in a parameter of the EPB.

* * * * *